United States Patent

[11] 3,578,144

[72] Inventor John M. Punzak
 West Hartford, Conn.
[21] Appl. No. 802,540
[22] Filed Feb. 26, 1969
[45] Patented May 11, 1971
[73] Assignee Monsanto Company
 St. Louis, Mo.

[54] CONVEYING ARTICLES
 2 Claims, 1 Drawing Fig.
[52] U.S. Cl. ..................................... 198/41,
 198/131, 198/189
[51] Int. Cl. .................................... B65g 17/46
[50] Field of Search .......................... 198/41,
 189, 131; 209/213 (Cursory)

[56] References Cited
 UNITED STATES PATENTS
672,663  4/1901  Baxter et al. ............. 198/41X 2,609,915  9/1952  De Burgh .................. 198/41
2,772,005  11/1956  Dubin et al. ............. 198/131X
2,940,581  6/1960  Chebuhar ................. 198/41X
3,052,340  9/1962  Lyons et al. ............. 198/41

Primary Examiner—Albert J. Makay
Attorneys—James C. Logomasini and Michael J. Murphy ABSTRACT: In a system for transporting articles, such as packaging containers, between work stations by means of an endless conveyor having spaced supports thereon and holders for the articles mounted either directly on the conveyor or on the supports attached to the conveyor, the improvement of utilizing permanent magnets for securing the holders in a readily releasable manner. A method is provided which requires that the magnetic field be sufficient to resist gravity separation but insufficient to prevent manual separation of the holders from their supports.

PATENTED MAY 11 1971
3,578,144
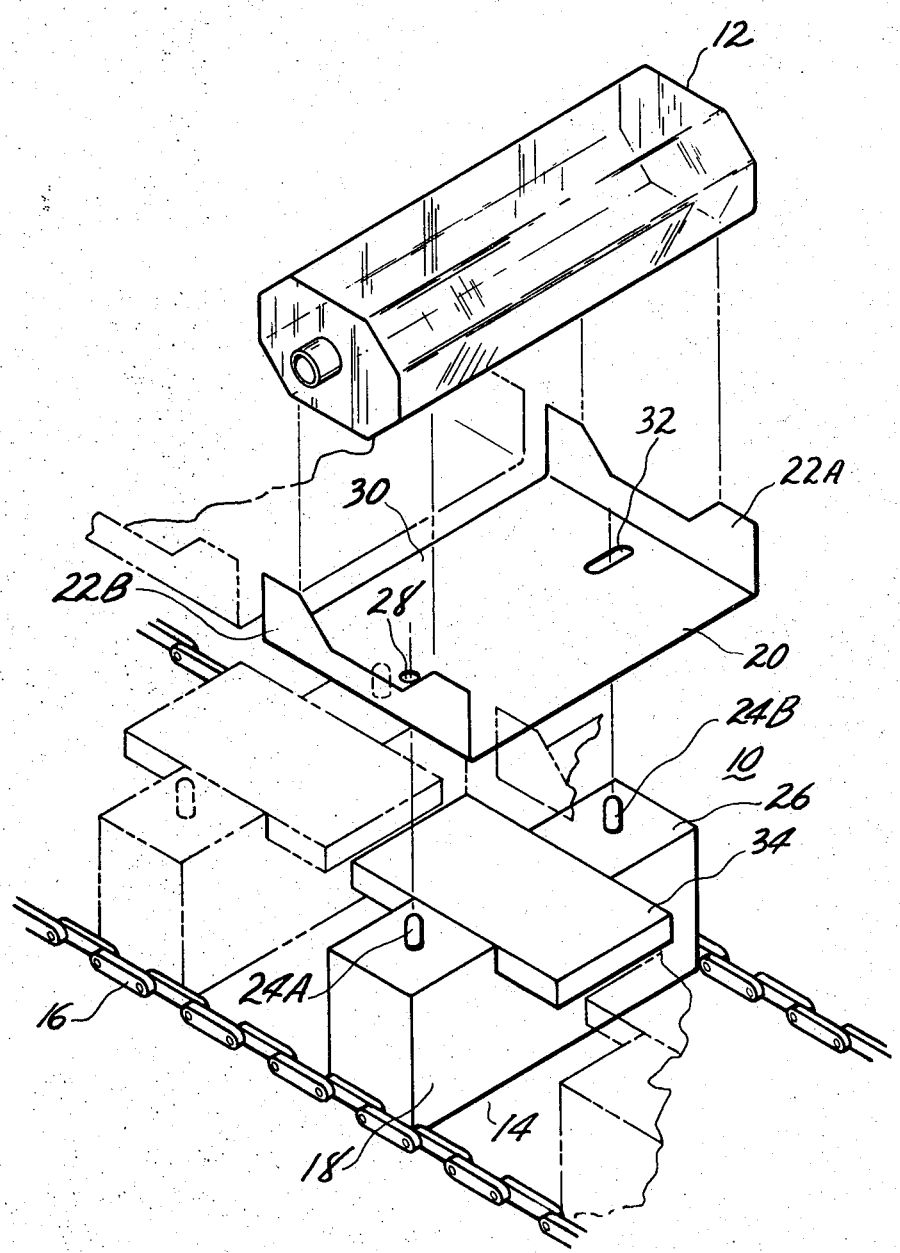
INVENTOR.
JOHN M. PUNZAK
BY Michael J. Murphy
ATTORNEY.

CONVEYING ARTICLES

BACKGROUND OF THE INVENTION

This invention relates to conveying articles and more particularly to a conveying system for transporting packaging containers, portions of which may be readily changed to facilitate handling different sized containers.

In the packaging industry, various operations must be performed on rather light articles such as plastic containers after their formation and prior to their being ready for sale to a consumer. These operations include trimming excess plastic from the article, treating to condition the article, decorating the article, e.g. labeling and printing, filling, capping, etc., each operation being carried out at some point downstream of the forming station. Various conveying systems, either of the continuous or intermittent type, are utilized to transport such articles between stations. The means of support of each workpiece in these systems usually includes an article holder, the supporting surface of which is contoured, at least in part, to correspond to a peripheral portion of the article to insure stabilized support during its movement between stations, or while being processed at a work station. When a production line is changed from one size or shape of product to another, it becomes necessary to replace the article holders with different sized units to accommodate the next style of container to be handled on the line. Since such a system includes one holder or piece of tooling per article while being processed, this may involve as many as a few hundred pieces per installation in the case of a high speed, mass production operation. Each holder is normally secured in two or more places by various means such as threaded fasteners, and this means a loss of considerable article processing time on each product changeover while the threaded fasteners for each holder are laboriously removed and replaced. Needless to say, each product changeover, therefore, results in objectionable expenditures of time and labor which adversely affect the economics of an installation.

SUMMARY OF THE INVENTION

Now there has been developed a new conveying system which eliminates the above-mentioned shortcomings of the prior art and which renders tooling changes quick, easy and simple.

Accordingly, it is an object of this invention to provide an improved system for conveying articles.

An additional object of this invention is to provide a conveying system for packaging containers which is simple and economical in construction and practical and reliable in operation.

A further object of this invention is to provide an improved conveying system of the type where article tooling moves either continuously or intermittently in a repeating pattern into and out of one or more processing stations.

Another object of this invention is to provide a conveying system of the aforementioned type constructed to facilitate a change of tooling to accommodate a different size or shape of container.

A particular object of this invention is to provide an improvement in the manner in which container tooling is held in place on a conveyor transporting containers between work stations.

Other objects of this invention will in part be obvious and will in part appear hereinafter.

These and other objects are accomplished by providing an apparatus for transporting articles, preferably packaging containers, which comprises conveying means including an endless conveyor, a plurality of article holders and a plurality of permanent magnets for attaching each of the holders to the conveying means.

The method of attaching the holders involves subjecting the holders to a magnetic field acting between the holders and the means of support thereof, the magnetic field being sufficient in magnitude to resist gravity separation of the holders from their means of support, but insufficient to prevent manual separations of the holders from their supports, whereby the holders may be readily manually removed from the conveyor by overcoming the force of the magnetic field.

BRIEF DESCRIPTION OF THE DRAWING

In describing the overall invention, reference will be made to the accompanying drawing which is a schematic, perspective view with parts separated, of the conveying system of the present invention.

DESCRIPTION OF THE PREFERRED EMBODIMENTS

Referring now to the drawing, there is shown an apparatus 10 for transporting packaging containers, one of which is typically shown as plastic bottle 12. Apparatus 10 includes conveying means 14 which includes a conveyor comprising two parallel endless linked chains 16 spaced from each other, and a plurality of supports 18 spaced apart from each other along chains 16 and spanning the distance between the chains. Supports 18 are fixed by suitable conventional means such as bolting, welding, etc., to chains 16. A plurality of removable container holders 20 are provided, only one being shown, but it being understood that one is provided for each support 18. Holders 20 are in the form of cradles having end walls 22A and 22B spaced from each other, portions of which define upwardly opening discontinuities within which a container 12 seats. These holders alternatively may include spaced sidewalls perpendicular to the end walls to aid in confining other bottle configurations, e.g. circular. Means are provided on each support 18 and holder 20 for orienting each holder in a predetermined position with respect to the conveyor, which preferably but not necessarily is perpendicular to the direction of movement of the conveyor. These means include locating pins 24A and 24B projecting upwardly about one-half inch from the top face 26 of each support 18, and an aperture 28 formed in base 30 of each holder 20 for snugly confining pin 24A. Aligned opposite aperture 28 at the other side of base 30 is slot 32 for enclosing dowel or locating pin 24B.

A permanent magnet 34 is provided for releasably attaching each holder 20 to its support 18 of the conveying means 14. Magnet 34 is press fitted within a slot formed in the top face 26 of support 18 such that the top surface of the magnet is flush with face 26. Alternatively, magnet 34 may be attached to support 18 by other means, for example threaded fasteners. Magnet 34 serves to attract and secure each holder to its support in a readily releasable manner. That is to say, the magnetic field is sufficient to resist gravity separation of a holder 20 as the endless conveyor means rotates into a position wherein holder 20 is facing downwardly, for example after having delivered article 12 to or through a processing station. The attractive force of the magnetic field must also be greater than any centrifugal force created when a holder-support combination travels around a corner in moving from an upwardly to a downwardly oriented position. This field also must be sufficient to resist any substantial movement of support 18 when jarred, for example during placement of a container on the support. However, this magnetic field cannot be so great as to prevent manual separation of holder 20 from support 18 by pulling it or forcing it away.

In changing over the container processing line from a container of the size and shape of article 12 to one of a different configuration, holder 20 is rapidly replaced by merely manually lifting it upwardly away from support 18 out of the field of magnet 34 and placing on the common support, another different holder contoured to accommodate the next size and/or style of container to be processed on the line. The alignment aperture in the base of the next holder is positioned with respect to dowel or locating pin 24A so that the holder will be oriented in the desired position with respect to the conveying means. Removal and replacement of bolts, screws, washers, etc. of the type used in the prior art for attaching each holder 20 to chain 16 is thus eliminated.

Since the containers contemplated for handling herein are rather light, e.g. between about 0.5 oz. to 1 lb., the magnetizable holders 20 are not of heavy construction, weighing, for example between about 2 oz. to 2 lbs., and consequently the force of the magnetic field to accommodate manual changeover of the holders should be between about 2 to 10 lbs. Force fields outside these ranges are either insufficient to overcome gravity separation, or too great to allow quick manual removal of the holders. Magnet 34 is rather small and compact, having a surface area facing an opposite surface portion of an article holder of between about 1 to 6 sq. in.

Suitable conventional means (not shown) are provided to move conveyor 16 in a continuous manner or alternatively in an intermittent manner to and/or through an article processing station.

The above description and particularly the drawing are set forth for purpose of illustration only and are not to be taken in a limited sense.

Obviously any type of material which is influenced by a magnetic field may be used to construct the article holders and supports of the present invention. Metals, such as any of the various grades of steel or iron are preferred for reasons of economy and ease of fabrication.

Though a horizontally oriented chain link conveyor is illustrated as the means for transferring the containers between processing stations, any form of vertically or angularly oriented endless conveyor would likewise give satisfactory results, as long as the influence of the magnetic field is sufficient to counteract the force of gravity tending to separate the article holders from their supports.

The magnets utilized in the present invention are of the permanent variety as opposed to electromagnets which are magnetized by electric current in a coil surrounding the core. Electromagnets are generally too bulky and not readily adaptable for use with a moving conveyor as contemplated by the present invention.

Though separate supports have been shown in the preferred embodiment of the drawing between the conveyor and the container holders, these may be unnecessary in some installations, it being possible to mount one or more magnets for attracting a holder directly on the conveyor. In this sense, a plurality of magnets may be used with any single support, though one is preferred for simplicity purposes.

It will be understood that many variations and modifications of the embodiment herein described will be obvious to those skilled in the art, and may be carried out without departing from the spirit and scope of the invention.

I claim:

1. Apparatus for transporting different sized containers comprising:
   a. an endless conveyor comprising two parallel members spaced from each other;
   b. a plurality of supports spaced apart along the conveyor;
   c. a plurality of different sized, removable container holders each of which is adapted to be mounted on the supports, each of said holders being in the form of a cradle having end walls spaced from each other a distance which is less than the total length of a container, each end wall having a recess formed therein adapted to contact a surface portion of one of said containers to support said one container in a horizontal position; and
   d. permanent magnets between the supports and the holders for securing the holders to the supports.

2. Apparatus for transporting articles comprising:
   a. conveying means including an endless conveyor;
   b. a plurality of article holders;
   c. a plurality of permanent magnets for attaching each of the holders to the conveying means; and
   d. a support for each article holder, said support having a slot formed in its surface for holding one of said magnets, each holder having an aperture and each support having a locating pin for insertion into the aperture to orient the holder in a predetermined position with respect to the conveyor.